US010605542B2

(12) United States Patent
Wortmann et al.

(10) Patent No.: US 10,605,542 B2
(45) Date of Patent: Mar. 31, 2020

(54) APPARATUS HAVING AT LEAST TWO SERIES-CONNECTED STORAGE CELLS FOR STORING A LIQUID

(71) Applicant: BASF SE, Ludwigshafen (DE)

(72) Inventors: Jürgen Wortmann, Limburgerhof (DE); Michael Ladenberger, Annweiler am Trifels (DE); Katharina Federsel, Heidelberg (DE)

(73) Assignee: BASF SE (DE)

( * ) Notice: Subject to any disclaimer, the term of this patent is extended or adjusted under 35 U.S.C. 154(b) by 322 days.

(21) Appl. No.: 15/310,543

(22) PCT Filed: May 13, 2015

(86) PCT No.: PCT/EP2015/060655
§ 371 (c)(1),
(2) Date: Nov. 11, 2016

(87) PCT Pub. No.: WO2015/173331
PCT Pub. Date: Nov. 19, 2015

(65) Prior Publication Data
US 2017/0074597 A1     Mar. 16, 2017

(30) Foreign Application Priority Data
May 15, 2014 (EP) .................................... 14168410

(51) Int. Cl.
*F28D 20/00* (2006.01)

(52) U.S. Cl.
CPC ...... *F28D 20/0034* (2013.01); *F28D 20/0039* (2013.01); *F28D 2020/0047* (2013.01);
(Continued)

(58) Field of Classification Search
CPC ................. F28D 20/0034; F28D 20/39; F28D 2020/0082; F28D 2020/86
(Continued)

(56) References Cited

U.S. PATENT DOCUMENTS 5,009,261 A * 4/1991 Kuhara ................... F04F 10/00
137/133
2011/0271953 A1* 11/2011 Wortmann .......... F28D 20/0034
126/619

FOREIGN PATENT DOCUMENTS

AU        2012249238 B1     9/2013
CA            2798229 A1    11/2011
(Continued)

OTHER PUBLICATIONS

Translation of DE 20013247 U1 entitled Translation—DE 20013247 U1.*
(Continued)

*Primary Examiner* — Paul Alvare
(74) *Attorney, Agent, or Firm* — Faegre Drinker Biddle & Reath LLP (57) ABSTRACT

At least two series-connected storage cells have hot liquid supplied to or removed from a first cell and cold liquid supplied to, or removed from, a final cell. The liquid temperature decreases from the first cell to the final cell. Individual cells are connected from the warmer cell lower region to the colder cell upper region. At least one cell is closed by a cover forming a gas space between the liquid and the cover. A gas line branches off from the gas space entering into the liquid of a colder cell or into the liquid in the connection of two adjacent cells. At least one of the adjacent cells has a lower temperature than that of the cell from the gas space of which the gas line branches off.

17 Claims, 8 Drawing Sheets

(52) U.S. Cl.
  CPC ............... *F28D 2020/0082* (2013.01); *F28D 2020/0086* (2013.01); *Y02E 60/142* (2013.01)

(58) Field of Classification Search
  USPC .......................... 165/301; 126/400; 137/595
  See application file for complete search history.

(56) References Cited

FOREIGN PATENT DOCUMENTS

| DE | 20013247 U1 * | 3/2001 | ......... F28D 20/0039 |
|----|---------------|--------|------------------------|
| DE | 202009003106 U1 | 7/2009 | |
| JP | 2001133176 A | 5/2001 | |
| WO | WO-2008027041 A1 | 3/2008 | |
| WO | WO-2011133987 A1 | 10/2011 | |
| WO | WO-2011138270 A1 | 11/2011 | |

OTHER PUBLICATIONS

International Preliminary Report on Patentability for PCT/EP2015/060655 dated Nov. 15, 2016 (English translation).
International Preliminary Report on Patentability (in German) for PCT/EP2015/060655 dated Sep. 8, 2015.
International Search Report for PCT/EP2015/060655 dated Sep. 8, 2015.

* cited by examiner

FIG.7

APPARATUS HAVING AT LEAST TWO SERIES-CONNECTED STORAGE CELLS FOR STORING A LIQUID

CROSS-REFERENCE TO RELATED APPLICATIONS

This application is a national stage application (under 35 U.S.C. § 371) of PCT/EP2015/060655, filed May 13, 2015, which claims benefit of European Application No. 14168410.0, filed May 15, 2014, both of which are incorporated herein by reference in their entirety.

The invention is based on an apparatus for storing a liquid, comprising at least two series-connected storage cells, with hot liquid being able to be supplied to, or removed from, a first storage cell via a first central line and with cold liquid being able to be supplied to, or removed from, a final storage cell of the series-connected storage cells via a second central line, and with the temperature of the liquid in the series-connected storage cells decreasing in each case from the first storage cell to the final storage cell, and the individual storage cells being connected to one another in each case via a connection from the lower region of the warmer storage cell to the upper region of the colder storage cell, and with at least one storage cell being closed by a cover and therefore a gas space being formed between the liquid in the storage cells and the cover.

Apparatuses for storing a liquid, from or to which apparatuses a hot liquid can be removed or supplied at one location and a cold liquid at another location, are used, for example, in solar power stations. The use of corresponding apparatuses makes it possible for a solar power station to be operated without interruption even in periods without sun, for example at night. In order to enable uninterrupted operation, large solar power stations require very large heat accumulators. For example, it is known that, in the currently widely operated parabolic-trough solar power stations with an electrical power of 50 MW, use is made of salt accumulators containing up to 28 000 t of salt as heat storage medium. The salt is stored in two dually arranged tanks. Under the effect of sunlight, heat transfer medium heated in the solar array is driven from the cold tank into the hot tank. During the unloading operation, the heat storage medium is removed from the hot tank and cooled in the power station, with electrical energy being generated. The cooled heat storage medium is returned to the cold tank.

In order to be able to operate solar power stations at a greater power or over a longer period of time without interruption, significantly larger heat accumulators compared with the currently known apparatuses for storing heat are required. In this connection, there is firstly the possibility of using a large number of smaller accumulators, but this requires a large amount of space or the use of large accumulators.

In order to avoid the production in the container of a negative pressure, which causes impermissibly large forces to act on the shell of the container, unoccupied volume in the containers is filled with a gas. In the case of oxidizable heat storage media, it is additionally necessary to avoid oxidation. To this end, for example, nitrogen is used as a gas for occupying the volume not filled by the heat storage medium. In the case of heat storage media which cannot oxidize, air may also be used for this purpose.

In the event of temperature fluctuations, the volumes taken up by the heat storage medium and the blanketing gases change because of thermal expansions of the heat storage medium and of the blanketing gases. The changing volume of the gaseous tank contents dominates here over the change in volume of the liquid tank contents. The change in volume can be controlled by removing gases, for example by outputting the gases into the atmosphere. However, the gases may comprise substances which are foreign to air and may have to be cleaned. Alternatively, the gases can be supplied to a gas accumulator and can be removed from there again. A further possibility is partly to operate the storage container under increased pressure. The controlling of high pressures through the design of the container necessitates a high expenditure. For this reason, additional pressure loadings of the casing of the container are intended to be eliminated. For this purpose, large containers are preferably operated at ambient pressure.

In order to avoid providing two individual tanks, it is known to use stratified accumulators, also referred to as thermocline accumulators. In a stratified accumulator, there is a vertical temperature gradient in the heat storage medium. Since the hot heat storage medium customarily has a lower density than cold heat storage medium, there is hot heat storage medium in the upper region of the stratified accumulator and cold heat storage medium in the lower region. By means of this sealing effect, a temperature stratification is stabilized in the container. The latter is hot in the upper region and cold in the lower region. During the loading of the heat storage medium, hot heat storage medium is supplied to the stratified accumulator in the upper region and cold heat storage medium is removed from the lower region. The total quantity of heat storage medium in the container remains substantially constant here. Correspondingly, during the unloading, the hot heat storage medium is removed from the upper region and the cold heat storage medium is supplied in the lower region.

A further advantage of the stratified accumulator is that the temperature in the gas space remains substantially constant since the temperature on the surface of the heat storage medium generally corresponds to that of the hot heat storage medium.

The use of stratified accumulators is particularly suitable in the case of heat storage media having low temperature conductivity, since the heat exchange in the heat storage medium within the stratified accumulator is thereby reduced, and therefore the temperature stratification is maintained even over a relatively long period of time.

However, in particular in the event of large quantities of liquid and great temperature differences between the cold and the hot liquid, a stratified accumulator has the disadvantage of requiring a very large overall height. However, the overall height is restricted by the hydrostatic pressure of the stored liquid, for example of the heat transfer medium. In order to counter this disadvantage, it is known from WO-A 2011/138270 to connect a plurality of storage cells, which are designed as stratified accumulators, in series. In this case, the hot liquid is removed from, or supplied to, the first, hot storage cell and the cold liquid is removed from, or supplied to, a final, cold storage cell. In order to keep the liquid level in the individual storage cells substantially constant, there is a liquid exchange in each case with the directly adjacent, series-connected storage cell, in which liquid exchange the colder liquid in the lower region of the warmer storage cell is in each case supplied to the colder storage cell in the upper region or, conversely, the liquid from the upper region of the colder storage cell is in each case supplied to the warmer storage cell in the lower region.

Gases may accumulate in the gas phase of each storage cell, said gases having to be removed. The gases can be produced, for example, by decomposition of the heat storage medium, or else can be inert gases released in the heat storage medium. The heat storage medium is preferably decomposed here in the storage cells having a high temperature.

It is the object of the present invention to provide an apparatus for storing a liquid, comprising at least two series-connected storage cells, in which the gas flow to be removed can be reduced and which, in addition, permits regeneration of the heat storage medium.

The object is achieved by an apparatus for storing a liquid, comprising at least two series-connected storage cells, with hot liquid being able to be supplied to, or removed from, a first storage cell via a first central line and with cold liquid being able to be supplied to, or removed from, a final storage cell of the series-connected storage cells via a second central line, and with the temperature of the liquid in the series-connected storage cells decreasing in each case from the first storage cell to the final storage cell, and the individual storage cells being connected to one another in each case via a connection from the lower region of the warmer storage cell to the upper region of the colder storage cell, and with at least one storage cell being closed by a cover and therefore a gas space being formed between the liquid in the storage cells and the cover, wherein a gas line branches off from at least one gas space and enters into the liquid of a colder storage cell or into the liquid in the connection of two adjacent storage cells, at least one of the adjacent storage cells having a lower temperature than the temperature of the storage cell, from the gas space of which the gas line branches off.

First of all, gas which accumulates in the gas space of the storage cell is conducted through the gas line, which branches off from a gas space, and into the liquid of a colder storage cell or into the liquid in the connection of two adjacent storage cells, of which at least one has a lower temperature than the temperature of the storage cell, from the gas space of which the gas line branches off, as soon as a pressure which is greater than the pressure at the entry point of the gas line is reached, and therefore a production of a positive pressure is prevented here. The entry of the gas line into the liquid has the further advantage that the gas which escapes from the gas line is initially brought into intensive contact with the liquid. In particular if the gas is produced by decomposition products of the liquid, there is thus the possibility of regeneration. In the colder liquid with which the gas is brought into contact, components of the gas can condense or can react chemically with the components of the liquid. In particular if the liquid comprises liquid decomposition products, regeneration of the liquid can thereby be permitted, in particular if the regeneration proceeds at lower temperatures than the decomposition. The entry of the gas line into the liquid and the resulting intensive contact of the warmer gas with the colder liquid has the further advantage that the contact time of the gas with the liquid is also significantly increased in comparison to an addition into the gas space of a storage cell, and therefore sufficient time is provided even for slowly proceeding reactions, in particular for regenerating the liquid.

The embodiment in which the gas line enters the liquid in the connection of two adjacent storage cells has the advantage that the temperature stratification in a storage cell is not disturbed here by gas rising in the liquid.

Any desired device through which a gas can be transported can be used as the gas line. Suitable gas lines include, for example, pipelines, gas-conducting ducts or gastight hoses.

Since, in particular in a solar power station, cold liquid is removed from the apparatus at times of solar irradiance, and is conducted through a solar array, in which the liquid absorbs heat, and is then returned to the apparatus as hot liquid, and, during times in which the sun does not shine, hot liquid is removed, the heat is used for generating steam and, subsequently, the liquid cooled in this manner is returned again to the apparatus as cold liquid, liquid which comprises a portion of thermally loaded heat transfer medium, which portion may have changed chemically, is located in general in all of the storage cells.

The apparatus according to the invention is suitable in particular as a heat accumulator for solar power stations, for example linearly concentrating solar power stations, for example parabolic-trough solar power stations or Fresnel power stations, or tower power stations, in which a molten salt is used as the heat storage medium. Said molten salt is then located in the storage cells of the apparatus as the liquid.

Salts customarily used as heat transfer media in solar power stations comprise, for example, alkali metal nitrates and/or alkali metal nitrites. However, nitrite salts, in particular, have the property at high temperatures, in general at temperatures above 400° C., of reacting to form nitrates, with nitrogen monoxide and alkali metal oxides or earth alkali metal oxides being formed.

This reaction is reversible, with, at lower temperatures, the resulting nitrate salts and oxides forming nitrite salts again in the presence of nitrogen monoxide. The reactivity required for regenerating the nitrite salts and the time are achieved in a large reaction volume by feeding the gas into the liquid with a large gas-liquid interface.

In one embodiment of the invention, the connection between two storage cells comprises an intercellular space, the intercellular space being separated from the colder storage cell by an overflow and from the warmer storage cell by a partition with an opening in the lower region, and therefore, during flow through the storage cells from the hot first storage cell to the cold final storage cell, the liquid flows in each case into the intercellular space through the opening in the lower region of the partition and out of the intercellular space into the colder storage cell via the overflow, or, in the event of flow in the opposite direction, flows into the intercellular space via the overflow and out of the intercellular space into the warmer storage cell through the opening in the lower region of the partition.

Alternatively to the design with an intercellular space, it is also possible, for example, to connect the individual storage cells to one pipeline each. The pipelines here run in each case from the lower region of a warmer storage cell to the upper region of a colder storage cell.

By the corresponding connection of the storage cells either via intercellular spaces or via pipelines, the warmer liquid of the colder storage cell flows in each case into the colder region of the warmer storage cell, and therefore the temperature of the warm liquid in the colder storage cell substantially corresponds to the temperature of the cold liquid in the warmer storage cell. Temperature differences between the warm liquid of the colder storage cell and the cold liquid of the warm storage cell result here in each case merely from heat losses which may occur in a storage cell, for example, due to a non-ideal insulating means, or on the basis of heat exchange effects in the event of prolonged storage.

The design of the apparatus in such a manner that an intercellular space is formed in each case between two storage cells is preferred, since this permits a compact construction. In addition, the intercellular space makes it possible to dispense with an insulating means on those sides of the storage cell on which the intercellular space is arranged for connection to an adjacent storage cell.

In addition to the gas lines which lead from the gas space of a warmer storage cell into the liquid in a colder storage cell, it is also possible to provide that a gas line branches off from at least one gas space of a storage cell and enters into the liquid of a warmer storage cell. In particular when commissioning or decommissioning the solar power station or else in the event of a change in operation from day mode with solar irradiance to night mode without solar irradiance, the additional gas lines which lead from the gas space of a colder storage cell into the liquid of a warmer storage cell make it possible for pressure differences in the gas spaces to be compensated for. In the event of a lower pressure in the warmer storage cells, gas can then pass from a colder storage cell into the warmer storage cell. On the other hand, it is possible, by means of the gas lines from the gas space of the warmer storage cell into the liquid of the colder storage cell, to bring about pressure equalization if the pressure in the gas spaces of the colder storage cells is lower than in the warmer storage cells.

In order to make it possible for gas to be able to flow in a specific manner only in one direction, it is possible, for example, to provide one or more gas lines with valves with which the gas lines can be opened or closed.

In order to enable equalization of gas throughout the apparatus, it is preferred if all of the storage cells are closed by a cover, and a gas line branches off at the cover from all of the storage cells apart from the coldest storage cell, said gas line leading into the adjacent colder storage cell or into the connection of the storage cell to the adjacent colder storage cell, and a gas outlet branches off from the cover of the coldest storage cell.

If, in addition, the gas lines are also provided from a gas space of a colder storage cell into the liquid of a warmer storage cell, it is furthermore particularly preferred if all of the storage cells are closed by a cover, and, from all of the storage cells apart from the warmest storage cell, a gas line branches off from the cover and enters into the liquid of the adjacent warmer storage cell.

In addition to the entry of the gas lines into the respectively adjacent storage cell, any other configuration is, of course, also possible. For example, it is possible for the gas lines not to lead into the directly adjacent storage cell, but rather, for example, for at least one storage cell to be skipped in each case. In this case, the gas lines can then lead from the gas spaces of the storage cells, for which there are no longer any corresponding colder or warmer storage cells, into the coldest or into the warmest storage cell in each case, for example. Alternatively, it is also possible to provide a plurality of gas outlets and to remove the gas from the storage cells, for which no corresponding colder or warmer storage cells exist, into which the gas line can lead.

In order to obtain a particularly good distribution of gas in the liquid, in particular whenever the gas may comprise degradation products of the liquid, which degradation products can be used again for the regeneration by means of a reversible reaction in the liquid, it is preferred if a gas distributor with which gas flowing through the gas line is distributed in the form of small froth bubbles in the liquid is formed at at least one end of the gas line, which end has entered into the liquid. It is particularly preferred if a gas distributor with which gas flowing through the gas line is distributed in the form of small froth bubbles in the liquid is formed at all of the ends of the gas lines, which ends have entered into the liquid. A corresponding gas distributor can be designed, for example, in the form of a closure plate with a plurality of small openings. In order to keep the pressure loss as small as possible, it is advantageous in this connection to provide the end of the gas line with a widened diameter portion which is closed by the plate. Alternatively, any other gas distributors can also be used, for example annular distributors or gas lines in which small openings through which the gas can escape are provided. In addition, a large gas/liquid interface can be realized in the storage cells by customary internals, for example structured or unordered packings.

So that the contact time of the gas in the liquid is as great as possible, it is furthermore preferred if the gas lines branching off from the cover enter at least into the lower third of the liquid when the storage cell is filled as far as the overflow. By this means, the gas has to flow upward through a long liquid section until the gas reaches the gas space of the storage cell. Since the entry has to overcome the hydraulic pressure of the liquid so that the gas can flow into the liquid from the gas line, it is furthermore preferred to accommodate a compressor in the gas line, with which compressor the gas is transported into the liquid of the adjacent storage cell or into the intercellular space. The compressor can be configured here in such a manner that the hydraulic pressure of the liquid at the end of the gas line can be overcome so that the gas correspondingly flows through the gas line. A further advantage of the use of a compressor is that a targeted outlet of gas from a gas space of a storage cell is possible. In a different manner than in the embodiment without a compressor, gas can then also be removed and supplied to an adjacent storage cell if the pressure in the gas space is still lower than the pressure at the point at which the gas line leads into the liquid.

In an embodiment of the invention, an apparatus for conveying the liquid is arranged in the connection between two adjacent storage cells. The apparatus for conveying the liquid makes it possible to convey the liquid into an adjacent storage cell irrespective of the hydrostatic pressure. This permits, for example, transport even if two storage cells are filled to the same height or even if the storage cell from which liquid is removed has a lower level than the adjacent storage cell, into which the liquid is transported. By this means, the operation of the apparatus is ensured irrespective of the levels in the individual storage cells. This is necessary in particular in the event of use as a heat accumulator in a solar power station so that the solar power station can be operated irrespective of the filling state of individual storage cells. In addition, a ground slope can be compensated for by the apparatus for conveying the liquid. It is no longer absolutely necessary for all of the storage cells to stand at the same height and to be filled to an equal height. The apparatus for conveying the liquid also permits identically designed storage cells, which preferably each have an identical filling height, to be placed on a different floor level.

A pump is customarily used as the apparatus for conveying the liquid. In this connection, any pump which can provide the desired liquid throughput and can be used for conveying the liquid used, for example a molten salt, can be used when the apparatus according to the invention is used as a heat accumulator in a solar power station.

If an intercellular space through which the liquid is transported is formed between two adjacent storage cells, it is advantageous to arrange the apparatus for conveying the liquid in the opening in the lower region of the warmer storage cell. In order to be able to ensure transport of the liquid both from the warmer storage cell into the colder storage cell and also from the colder storage cell into the warmer storage cell, it is possible to use two pumps having an opposed conveying direction in each case and then in each case to operate the pump with which the liquid is conveyed in the desired direction. Alternatively, it is also possible to use a pump with which a reversal of the conveying is possible, and therefore, with the same pump, liquid can be conveyed from the colder storage cell into the warmer storage cell or from the warmer storage cell into the colder storage cell, depending on requirements.

In the event of a connection of two storage cells via a pipeline, the apparatus for conveying the liquid can be placed at any desired position in the pipeline. In particular when two storage cells are connected via a pipeline, it is preferred if a pump in which the conveying direction can be reversed is used as the apparatus for conveying the liquid. Alternatively, it is also possible in this case to design the pipeline with a bypass, wherein one pump is arranged in the region of the bypass in the pipeline and a second pump is arranged in the bypass, and therefore the liquid is conveyed either through the pipeline or through the bypass, depending on the conveying direction. Of course, in addition to the design with a bypass, it is furthermore also possible to connect two adjacent storage cells in each case to two pipelines, wherein an apparatus for conveying the liquid, with which transport from the colder storage cell into the warmer storage cell takes place, is arranged in one pipeline and the transport from the warmer storage cell into the colder storage cell correspondingly takes place in the other direction in the second pipeline.

In particular in conjunction with the apparatus for transporting the liquid between two storage cells, it is preferred to install a level controller in the storage cells, the level controller being designed in such a manner that, when a maximum level is reached, liquid is conveyed into an adjacent storage cell. By this means, it is possible to remove liquid from a storage cell in a targeted manner if the maximum level is exceeded. By this means, it can be ensured, for example, that there is always a minimum gas space above the liquid. In addition, an overfilling of the storage cell, which can then lead to a rise in pressure, can be avoided.

In addition to the level controller, in which liquid is conveyed into an adjacent storage cell when a maximum level is reached, it is also possible to provide a level controller which is designed in such a manner that, if a minimum level is fallen short of, liquid is conveyed into the storage cell from an adjacent storage cell. This may be necessary in particular for reliable operation in order, for example, to avoid pumps from being able to run dry.

In particular if the apparatus according to the invention is used as a heat accumulator in a solar power station and the liquid stored in the apparatus is a molten salt, it has to be ensured that restarting of the operation is possible even after a prolonged operational failure, in which, for example, the temperature drops below the melting point of the salt, and therefore the salt begins to solidify. For this purpose, it is possible, for example, to equip each storage cell with a heat exchanger, the heat exchangers of adjacent storage cells in each case being connected to one another and a heat transfer medium flowing through all of the heat exchangers in series. In this case, it is advantageous to transport the heat transfer medium through the heat exchangers in the direction from the warmest storage cell to the coldest storage cell. Of course, however, a flow of the heat transfer medium in the opposite direction through the heat exchangers is also possible. Furthermore, it is also possible to use the liquid in a storage cell as an additional heat carrier, wherein, in this case, it is also possible for only one storage cell to be equipped with a heat exchanger. The heat exchanger can then be used, for example, as a steam generator. However, an arrangement in which all of the storage cells are equipped with a heat exchanger is preferred.

In addition to the aspect of directly heating the salt in the storage cells by the use of the heat exchangers, it is also possible to use the entire apparatus as a heat exchanger. In this case, the medium flowing through the heat exchangers absorbs heat from the liquid from the storage cells. At the same time, in this case, the liquid is preferably also conveyed through the storage cells, with cold liquid being removed in each case, being heated externally—for example by solar irradiance—and being conducted back again as warm liquid.

In order not to have to expensively thermally insulate each individual storage cell fully at all of the walls and in order, in addition, to position the storage cells in as space-saving a manner as possible, it is preferred if the storage cells are arranged helically around a center point. In this case, warm storage cells are in each case located in the direct vicinity of one another, and therefore an insulating means, such as would be required toward the environment, is not necessary. It is necessary for a full insulating means to be provided only with the outermost storage cells. A further advantage of the helical arrangement is that the storage cells in each case support one another, since said storage cells are in each case filled to substantially the same height. Substantially identical pressures therefore act on the walls of two mutually adjacent storage cells, which results in mechanical stabilization. A pressure-bearing wall which ensures the necessary mechanical and static stability is then advantageously constructed around the outermost of the helically arranged storage cells.

In order to prevent a compensation of the temperature between two adjacent storage cells and to compensate for thermal expansions due to temperature changes, it is, of course, also possible to place temperature- and pressure-resistant insulating material between the storage cells. It is particularly preferred here if a thermal insulating means is accommodated between adjacent storage cells in the helical arrangement that are not connected to one another via an intercellular space.

For a simple construction of the apparatus with helically arranged storage cells, it is preferred if the first storage cell is arranged in the center of the helically arranged storage cells and the final storage cell is arranged at the outer edge. In this connection, it is both possible for the first storage cell to be the coldest storage cell and for the final storage cell to be the warmest storage cell, and for the first storage cell to be the warmest storage cell and for the final storage cell to be the coldest storage cell.

In order to be able to compensate for thermal stresses and different thermal expansions which may arise due to temperature differences in a storage cell, it is furthermore preferred if each storage cell has a thermal compensating profile. The thermal compensating profile here can be realized, for example, in the form of a shaft running from the top downward in the storage cell, or an indentation in at least one wall, the indentation protruding into the storage cell. In the case of a helical arrangement of the storage cells, it is preferred if the thermal compensating profile is formed on those sides which, in the case of the helical arrangement, are adjoined by the next storage cell in the circumferential direction. Of course, in addition or alternatively, a thermal compensating profile can also be formed in the other walls of the storage cell. Furthermore, it is also possible and advantageous to provide a thermal compensating profile on the base of the storage cell.

In particular in the case of an arrangement in which the storage cells are arranged directly adjacent to one another, for example in the case of the helical arrangement, linear extensions of the walls can be compensated for by the thermal compensating profile, and therefore said linear extensions do not exert any force on adjacent storage cells.

Further, it is possible to place multiple storage cells in a housing. In this case the storage cells and the housing are designed in such a way that it is possible to remove and exchange the storage cells each individual. For this purpose, the storage cells preferably are immerged in a liquid bath in the housing. Due to the liquid bath, even with a storage cell removed, the same pressures act on the walls of the remaining storage cells as in the case when all storage cells are present. Therefore, it not necessary to design the walls of the storage cells such that they can absorb large pressure differences between the liquid inside the storage cell and the surroundings. Due to the liquid bath, essentially the same pressures act on the wall from inside and from outside. The liquid which is used for the liquid bath can be the same liquid which also is contained in the storage cells. However, it is also possible to use a liquid as liquid for the liquid bath which is suitable for use in the temperature range in which the storage cells are operated. A suitable liquid for example is a salt melt which differs in its composition from the liquid in the storage cells. Solar salt for example is suitable as liquid for the liquid bath. The liquid which surrounds the storage cells in the housing is a permanent liquid which is not involved in the heat exchange for the heat storage in the storage cells. To insulate the storage cells thermally against the liquid in the housing which surrounds the storage cells, it is possible to supply the walls with a suitable insulation.

In the case of a helical construction, in which the colder storage cells are arranged on the outside and the hot storage cells are arranged in the center, in addition to the advantage of better distribution of heat, there is additionally the advantage, when the apparatus according to the invention is used as a heat accumulator in a solar power station, that, for the construction of the external casing, use can be made of high-strength steels which would no longer have had sufficient strength in the interior space with the high temperatures prevailing there. In the interior, use can be made of less strong materials, since the walls of the storage cells can be supported in each case on the neighboring cells and pressure forces can be compensated for by the generally identical filling height.

Examples of the invention are illustrated in the figures and are explained in more detail in the description below.

Figure 1:
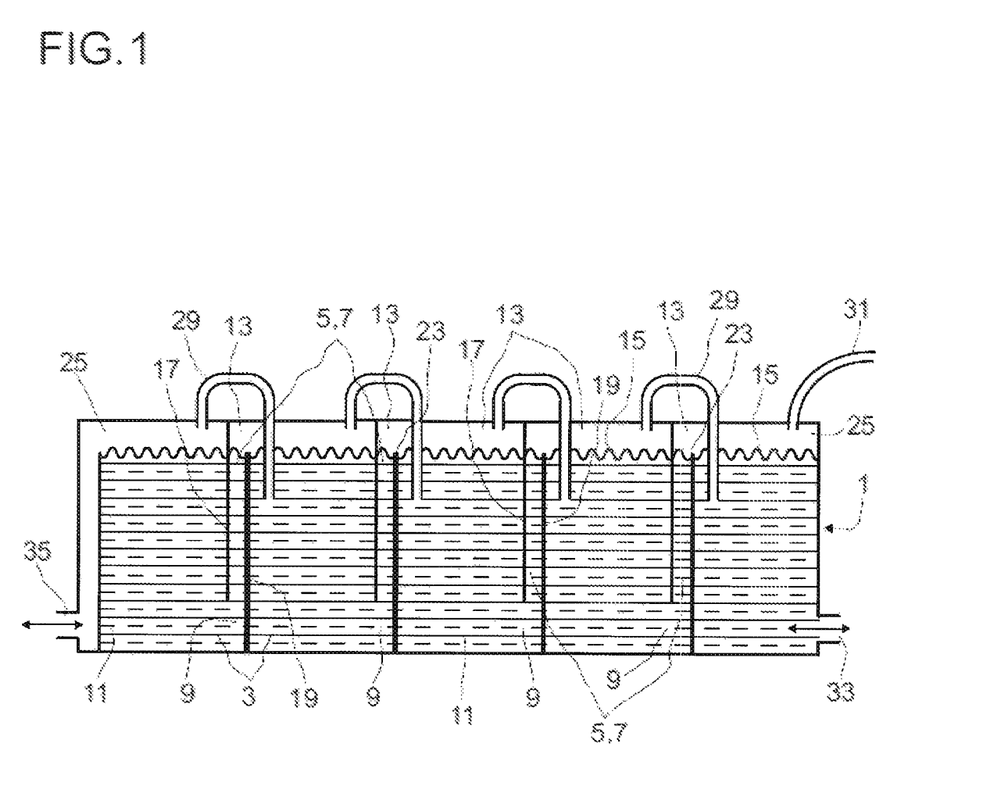
FIG. 1 shows a plurality of series-connected storage cells, with a gas line branching off from the gas space of each storage cell and leading into the liquid of an adjacent storage cell.

In the figures:

FIG. 1 illustrates a plurality of series-connected storage cells, with a gas line branching off from the gas space of each storage cell and leading into the liquid of an adjacent storage cell.

An apparatus 1 for storing a liquid comprises a plurality of storage cells 3 which are in each case in the form of stratified accumulators, and therefore the liquid is warmer at the top and colder at the bottom in each storage cell 3 in accordance with the density thereof.

Two respectively adjacent storage cells 3 have a connection 5 which is designed in such a manner that the warmer, upper region of a colder storage cell 3 is connected to the lower, colder region of a warmer storage cell 3. By this means, the temperature of the warmer liquid in the colder storage cell 3 corresponds in each case to the temperature of the colder liquid in the warmer storage cell 3.

In the embodiment illustrated here, the connection 5 is designed in the form of an intercellular space 7. In order for liquid to be able to be transported via the intercellular space 7, the intercellular space 7 is connected via a lower opening 9 to the lower region 11 of the warmer storage cell 3 and via an upper opening 13 to the upper region 15 of the colder storage cell 3. The intercellular space 7 and the openings 9, 13 can be realized, for example, in such a manner that the intercellular space 7 is delimited from the warmer storage cell 3 by a first wall 17 and from the colder storage cell 3 by a second wall 19. The first wall 17 here ends above the base 21 of the warmer storage cell 3 and of the intercellular space 7, and therefore the lower opening 9 is formed between the base 21 and the first wall 17. Alternatively, it is, of course, also possible to form a sufficiently large opening in the first wall 17. In contrast, the second wall 19 stands on the base between the intercellular space 7 and the colder storage cell 3, the second wall 19 ending at an overflow 23 below the maximum filling height of the colder storage cell 3, and therefore the liquid flows out of the colder storage cell into the intercellular space 7 via the overflow 23. However, as an alternative to the overflow 23, it is also possible to form an opening, through which the liquid can flow, at a corresponding position in the second wall 19.

In order to minimize a transfer of the heat of the liquid from the intercellular space 7 to the liquid in the storage cells 3, it is preferred if at least the second wall 19, but preferably the two walls 17, 19, is or are manufactured from a thermally insulating material or has or have a thermal insulating means.

A gas space 25 is located in each storage cell 3 above the liquid. According to the invention, the gas space 25, and therefore the storage cell 3, is closed by a cover 27. A gas line 29 branches off from the gas space 25. The gas line 29 here is guided in such a manner that said gas line leads into the liquid in a colder storage cell 3. So that positive pressure does not build up in the coldest storage cell 3, the coldest storage cell 3 is provided with a gas outlet 31 through which the gas can be removed. The gas removed from the gas outlet 31 can either be dispensed into the environment or—in particular if the gas in the gas spaces 25 of the storage cells is an inert gas or has a composition with which regeneration of the liquid in the storage cells 3 is possible—can be conducted into a gas accumulator.

The liquid stored in the apparatus can be used, for example, as a heat accumulator. This is advantageous particularly in solar power stations so that the latter can be operated not only in the event of solar irradiance, but also at times in which solar irradiance is not available.

In order to heat up the liquid, the latter is removed from the coldest storage cell 3 through a second central line 33, wherein the second central line 33 is arranged in the lower region of the coldest storage cell 3. The removed liquid absorbs heat in a solar array and the liquid heated in this manner is supplied to the warmest storage cell 3 via a first central line 35. The first central line 35 here is arranged in the upper region of the warmest storage cell. In order to equalize the liquid between the individual storage cells, liquid flows through the connections 5 between two storage cells from the warmest storage cell 3 in the direction of the coldest storage cell 3. The stored heat can be used at times at which solar irradiance is not available. For this purpose, the liquid is removed from the warmest storage cell 3 via the first central line 35, is supplied to a heat exchanger in which the heat is dispensed to a steam circuit, and the liquid cooled in this manner is then returned to the coldest storage cell 3 via the second central line. In this case, liquid between the individual storage cells 3 is then equalized by liquid flowing in each case from a colder storage cell 3 into the adjacent, warmer storage cell 3 via the connection 5 of the adjacent storage cells 3.

As an alternative to the connection 5, which is illustrated here, between two storage cells 3 in the form of an intercellular space 7, it is also possible, for example, to design the connection 5 in the form of a pipeline. In addition, it is possible to accommodate an apparatus for conveying the liquid, for example a pump, in the connection 5 between two storage cells 3. In the embodiment illustrated here with the intercellular space 7, the pump is preferably positioned in the lower opening 17. In this connection, use can either be made of one pump, the conveying direction of which can be reversed, or, alternatively, of two adjacent pumps with respectively opposed conveying directions. If the connection 5 is a pipeline, the pump can be positioned at any suitable location in the pipeline.

Figure 2:
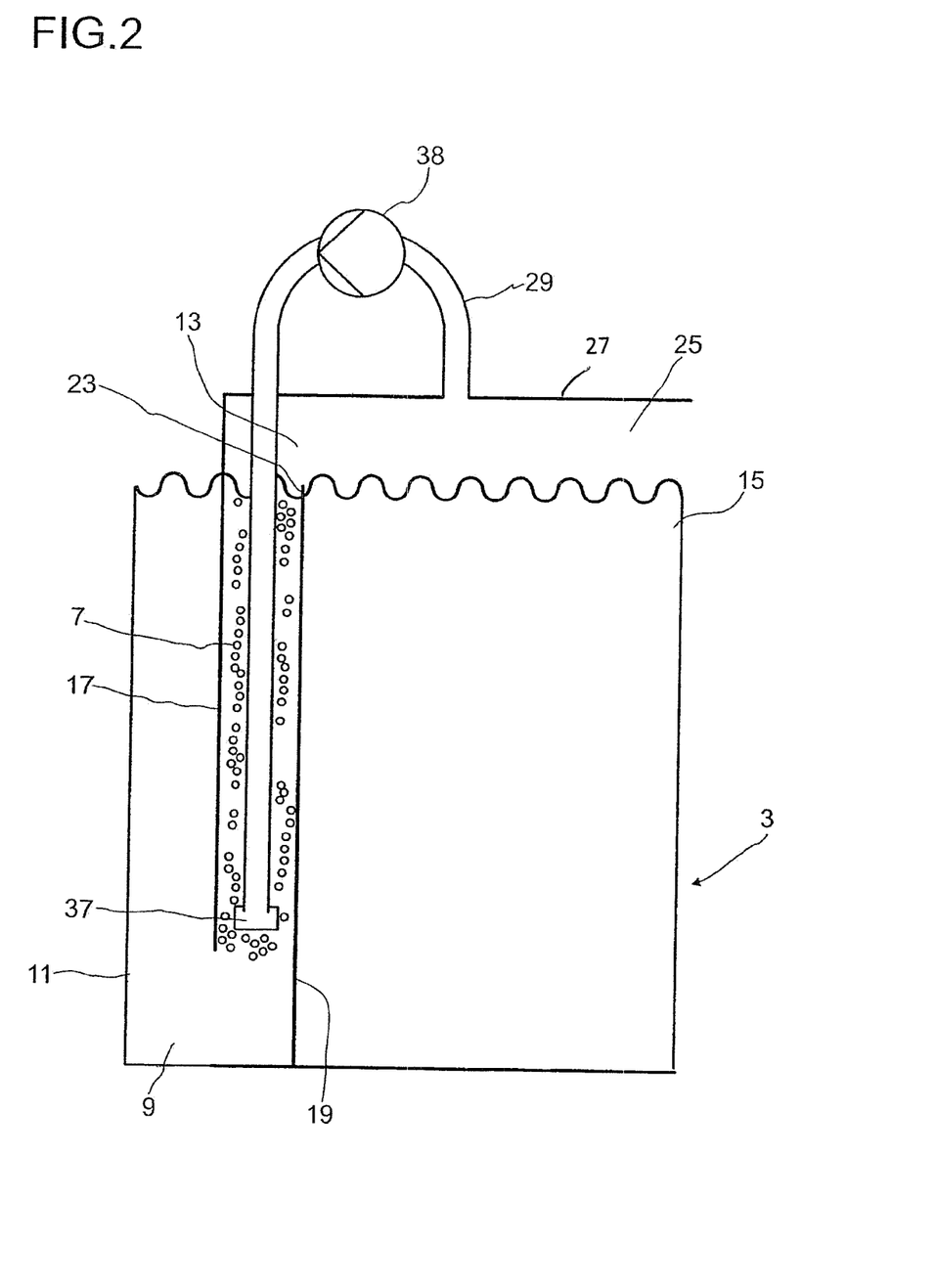
FIG. 2 shows a storage cell, from the gas space of which a gas line branches off and leads into an intercellular space between two storage cells.

FIG. 2 shows a storage cell, from the gas space of which a gas line branches off and leads into an intercellular space between two storage cells.

As an alternative to the embodiment which is illustrated in FIG. 1 and in which the gas line 29 leads into the liquid in a colder storage cell 3, the gas line 29, according to the embodiment illustrated in FIG. 2, leads into the connection 5 between two adjacent storage cells 3. This has the advantage that the temperature stratification of the liquid in a storage cell 3 is not disturbed by gas flowing in.

In addition, in the embodiment illustrated in FIG. 2, the gas line 29 ends lower in the liquid. This has the further advantage that longer contact of the liquid with the gas can be realized.

This is desirable in particular if the liquid can be regenerated by the contact of the liquid with the gas.

For improved regeneration, good exchange between the gas and the liquid is necessary. This can be realized, for example, by the use of a suitable gas distributor 37 with which the gas is fed in the form of small froth bubbles into the liquid.

In order to be able to overcome the hydrodynamic pressure and to be able to feed the gas into the liquid, the gas line 29 additionally accommodates a compressor 38 with which the gas is sucked out of the gas space 25 and introduced into the liquid.

Of course, the entry depth of the gas line and the use of a gas distributor for producing fine gas bubbles can also be used in the arrangement illustrated in FIG. 1.

Figure 3:
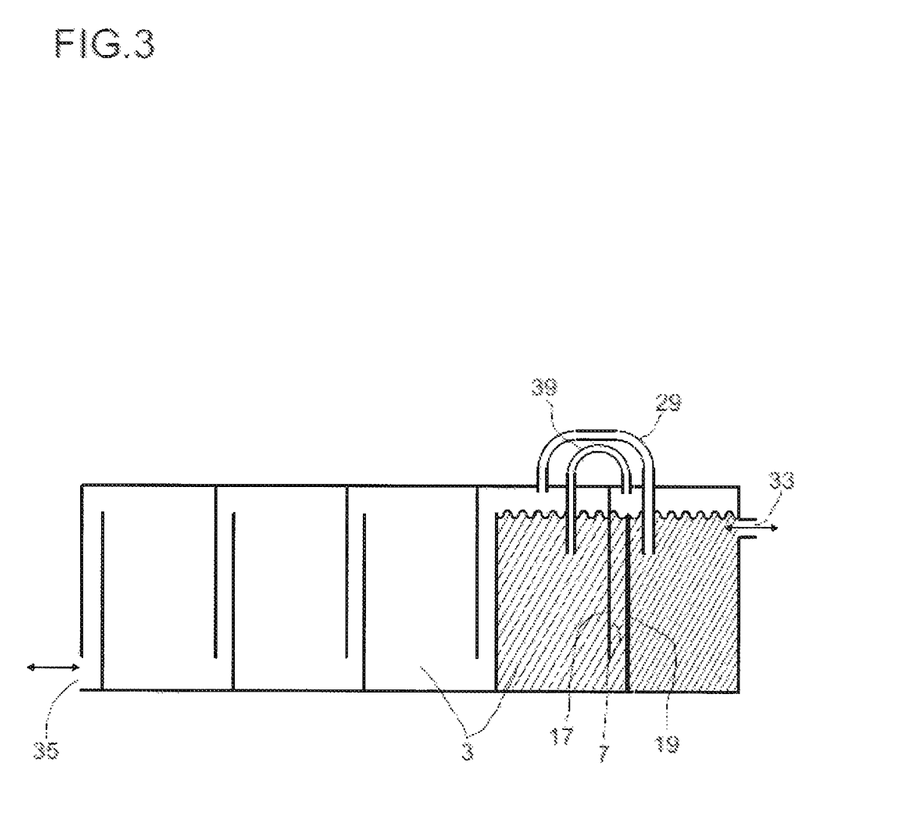
FIG. 3 shows a plurality of series-connected storage cells, with a gas line branching off from the gas space of each storage cell and leading into the liquid of an adjacent, colder storage cell and with a gas line branching off from said gas space and leading into the liquid of an adjacent, warmer storage cell.
Figure 3A:
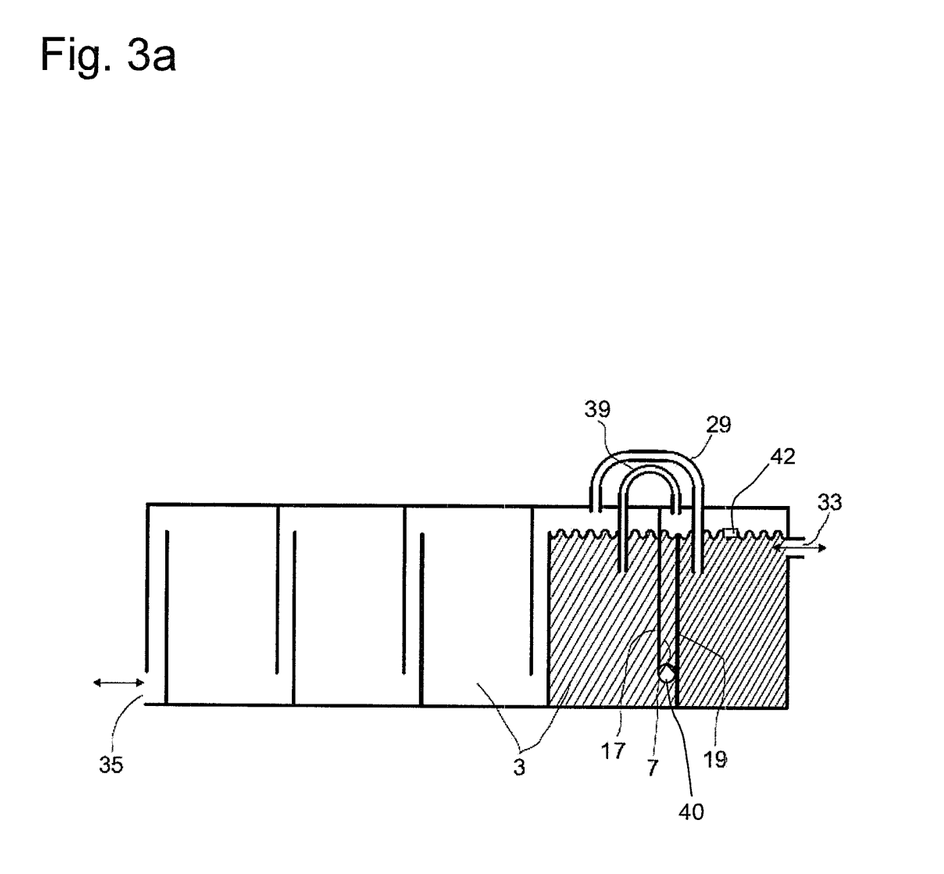

FIG. 3 illustrates a plurality of series-connected storage cells, with a gas line branching off from the gas space of each storage cell and leading into the liquid of an adjacent, colder storage cell and with a gas line branching off from said gas space and leading into the liquid of an adjacent, warmer storage cell.

The embodiment illustrated in FIG. 3 differs from that illustrated in FIG. 1 in that, in addition, a second gas line 39 branches off from each gas space and leads into the liquid of a warmer storage cell 3. This enables pressure to be equalized both in the direction of the colder storage cells 3 and in the direction of the warmer storage cells 3.

Figure 4:
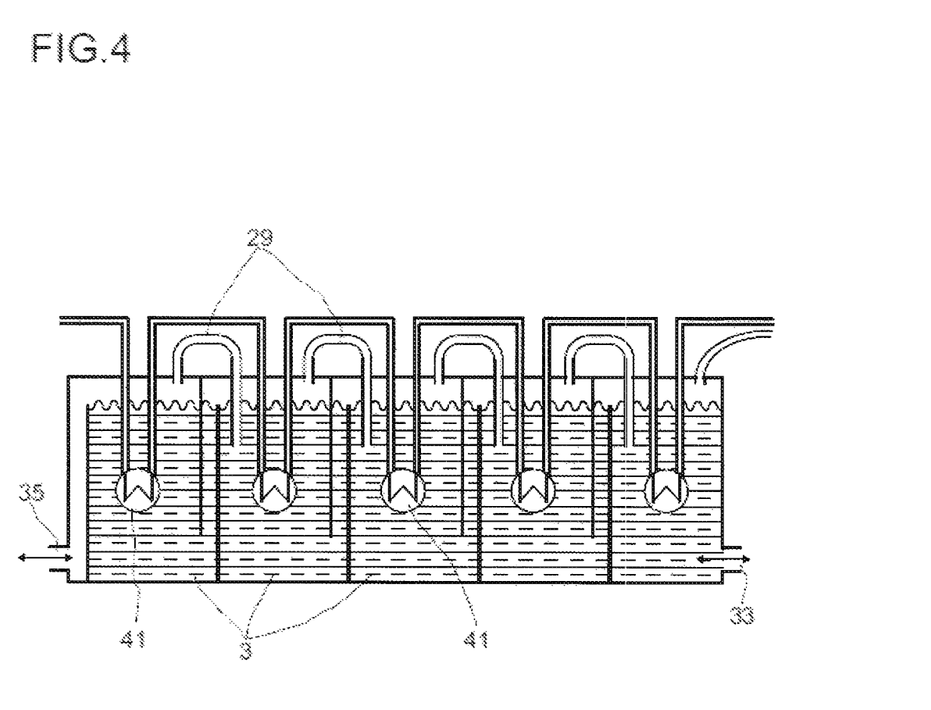
FIG. 4 shows a plurality of series-connected storage cells, in each of which a heat exchanger is accommodated.

In the embodiment illustrated in FIG. 4, a heat exchanger is accommodated in each of a plurality of series-connected storage cells.

A respective heat exchanger 41 can additionally be accommodated in the storage cells 3. In the embodiment illustrated here, each storage cell 3 is equipped with a heat exchanger 41. The heat exchangers 41 here are connected in series, and therefore the heat transfer medium flows through all of the heat exchangers 41 in the series. The heat exchangers can firstly provide additional safety by being able to be used—in particular when the apparatus is used in solar power stations—in order, after a prolonged shut down, again to preheat salt which is stored in the apparatus and, secondly, the liquid stored in the apparatus can also be used directly as a heat carrier in order to heat the heat transfer medium flowing through the heat exchangers 41. In this connection, it is also possible, for example, for the heat exchangers 41 to be used as steam generators and for the heat transfer medium flowing through the heat exchangers 41 to be water which is first of all heated, then evaporated and superheated. The heat transfer medium here can flow through the heat exchangers 41 either in the direction from the coldest storage cell 3 to the warmest storage cell 3 or in the opposite direction from the warmest storage cell 3 to the coldest storage cell 3.

In order to be able to arrange the series-configured storage cells 3 as compactly as possible and in order, in addition, to be able to save on insulating material and construction material, it is preferred to arrange the storage cells 3 helically. Such a helical arrangement of the storage cells is illustrated in a top view in FIG. 5.

Figure 5:
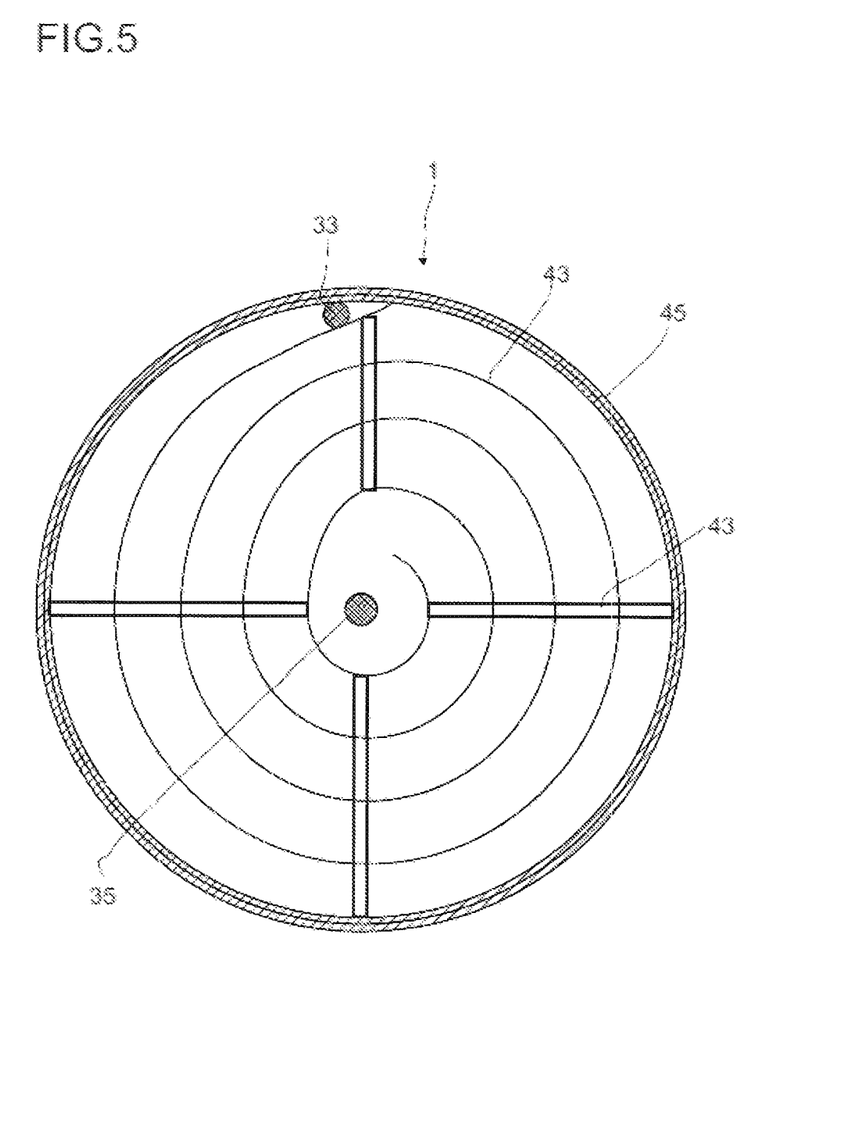
FIG. 5 shows a top view of a helical arrangement of the storage cells.

It is particularly preferred if, in the helical arrangement, the hottest storage cell 3 is arranged in the center and the coldest storage cells 3 arranged at the edge. By this means, the entire apparatus needs to be insulated from the environment only in respect of the colder liquid. By means of the helical arrangement, the intercellular walls 43 can be configured, as described above, to have less stability since adjacent cells stabilize one another by means of the liquid contained therein. Only the outermost storage cells 3 have to be supported by a pressure-bearing wall 45 which surrounds the entire helical arrangement.

Figure 6:
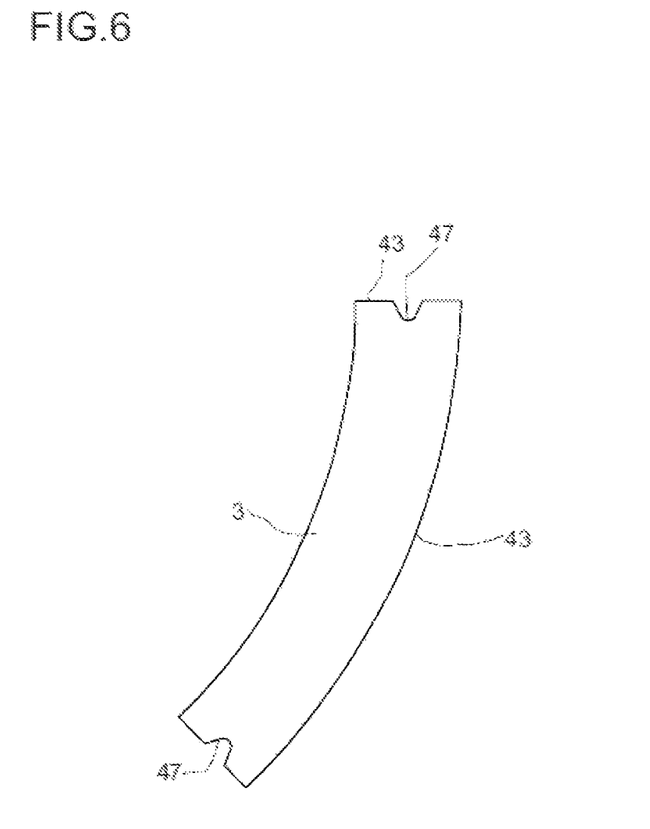
FIG. 6 shows a top view of a storage cell of a helical arrangement with thermal compensating profiles.

In order to compensate for changes in geometry occurring due to temperature fluctuations, it is advantageous if the storage cells are equipped with thermal compensating profiles 47. A top view of a storage cell 3 of a helical arrangement with thermal compensating profiles 47 is illustrated in FIG. 6. The thermal compensating profile can be designed here, for example as illustrated here, in the form of an indentation running from the top downward in the wall of the storage cell 3.

Figure 7:
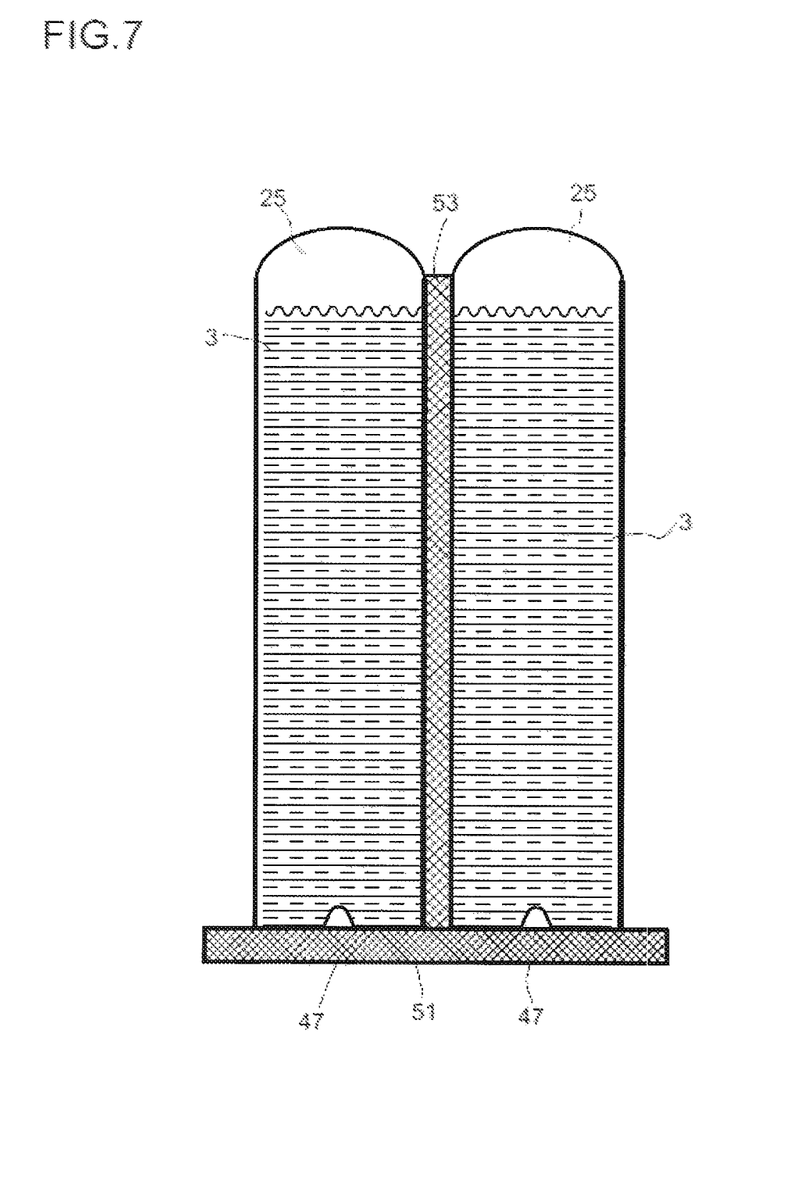
FIG. 7 shows a sectional illustration through two adjacent storage cells with a thermal compensating profile in the base.

FIG. 7 illustrates a sectional illustration through two adjacent storage cells with a thermal compensating profile in the base.

So that no heat is dispensed to the base from the arrangement, the storage cells 3, as illustrated in FIG. 7, have an insulating means 51 preferably at the base 49. The base 49 of the storage cell 3, which base rests on the insulating means 51, can additionally be configured with a thermal compensating profile 47 to compensate for thermally induced changes in length.

So that no heat is dispensed from one storage cell to adjoining storage cell, it is furthermore advantageous if a wall insulating means 53 is formed between two storage cells. In addition, the wall insulating means 53 is preferably pressure resistant so that pressure forces acting on the walls of the storage cells 3 can be compensated for by the pressure forces acting on the wall of the adjacent storage cell 3.

LIST OF REFERENCE NUMBERS

1 Apparatus for storing liquid
3 Storage cell
5 Connection of two storage cells 3
7 Intercellular space
9 Lower opening
11 Lower region
13 Upper opening
15 Upper region
17 First wall
19 Second wall
21 Base
23 Overflow
25 Gas space
27 Cover
29 Gas line
31 Gas outlet
33 Second central line
35 First central line
37 Gas distributor
38 Compressor
39 Second gas line
41 Heat exchanger
43 Intercellular walls
45 Pressure-bearing wall
47 Thermal compensating profile
49 Base
51 Insulating means
53 Wall insulating means

The invention claimed is:

1. An apparatus for storing a liquid, comprising at least two series-connected storage cells (3), including a first storage cell and a final storage cell wherein the liquid in the at least two storage cells is warmer in the first storage cell than in the final storage cell, the at least two series-connected storage cells comprising at least one pair of adjacent storage cells (3) wherein the liquid in the storage cell (3) is warmer in the storage cell (3) of each pair which is closer to the first storage cell (3) than the liquid in the other of the pair whereby the storage cell (3) of each pair which is closer to the first storage cell (3) is a warmer storage cell (3) and the other of the pair is a colder storage cell (3), the liquid being able to be supplied to, or removed from, the first storage cell (3) via a first central line (35) and with the liquid being able to be supplied to, or removed from, the final storage cell of the at least two series-connected storage cells (3) via a second central line (33), and with the temperature of the liquid in the at least two series-connected storage cells (3) decreasing from the first storage cell (3) to the final storage cell (3), and each storage cell of the at least two series-connected storage cells (3) being connected to one another via a connection (5;7) from a lower region (11) of the warmer storage cell (3) to an upper region (15) of the colder storage cell (3) of the two adjacent storage cells, with at least one storage cell (3) being closed by a cover (27) and therefore a gas space (25) being formed between the liquid in the at least one storage cell (3) and the cover (27), wherein a gas line (29) branches off from at least one gas space (25) and enters into the liquid of the colder storage cell (3) of the two adjacent storage cells or into the liquid in the connection (5;7) of two adjacent storage cells (3), at least one of the two adjacent storage cells (3) having a lower temperature than the temperature of the storage cell (3), from the gas space (25) of which the gas line (29) branches off, and the gas line (29) communicating with the gas space (25) in a way whereby gas which accumulates in the gas space (25) is conducted through the gas line (29) into the liquid of the colder adjacent storage cell (3) or into the connection (5;7) of the two adjacent storage cells as soon as a pressure in the gas space which is greater than the pressure at the entry point of the gas line (29) is reached.

2. The apparatus according to claim 1, wherein the connection (5;7) between two adjacent storage cells (3) comprises an intercellular space (7), the intercellular space (7) being separated from the colder storage cell (3) by an overflow (23) and from the warmer storage cell (3) by a partition (17) with an opening (9) in the lower region (11), and therefore, during flow through the at least two series-connected storage cells (3) from the hot first storage cell (3) to the cold final storage cell (3), the liquid flows for each pair of adjacent storage cells into the intercellular space (7) through the opening (9) in the lower region (11) of the partition (17) and out of the intercellular space (7) into the colder storage cell (3) via the overflow (23), or, in the event of flow in the opposite direction, flows into the intercellular space (7) via the overflow (23) and out of the intercellular space (7) into the warmer storage cell (3) through the opening (9) in the lower region (11) of the partition (17).

3. The apparatus according to claim 1, wherein a second gas line (39) branches off from at least one gas space (25) of the colder storage cell (3) of the pair of adjacent storage cells and enters into the liquid of the warmer storage cell (3).

4. The apparatus according to claim 1, wherein all of the at least two series-connected storage cells (3) are closed by a cover (27), and the gas line (29) branches off at the cover (27) from all of the at least two series-connected storage cells (3) apart from the final storage cell, said gas line leading into the colder storage cell of each pair of adjacent storage cells (3) or into the connection (5;7) of the storage cell (3) to the adjacent storage cell (3), and a gas outlet (31) branches off from the cover (27) of the final storage cell (3).

5. The apparatus according to claim 3, wherein all of the at least two series-connected storage cells (3) are closed by a cover (27), and, from all of the at least two series-connected storage cells (3) apart from the warmest storage cell, a gas line (39) branches off from the cover (27) and enters into the liquid of the warmer storage cell (3) of each pair of adjacent storage cells.

6. The apparatus according to claim 1, wherein a gas distributor (37) with which gas flowing through the gas line (29;39) enters into the liquid is formed at least one end of the gas line (29;39), the end that has entered the liquid.

7. The apparatus according to claim 1, wherein the gas line (29) branching off from the cover (27) enter at least into the lower third of the liquid height when the storage cell (3) is filled as far as an overflow (23).

8. The apparatus according to claim 1, wherein a compressor (38) with which the gas is transported into the liquid of the adjacent storage cell (3) or into the intercellular space (7) is accommodated in the gas line (29;39).

9. The apparatus according to claim 1, wherein an apparatus for conveying the liquid is arranged in the connection (5;7) between two adjacent storage cells (3).

10. The apparatus according to claim 1, wherein each of the at least two series-connected storage cells (3) is equipped with a heat exchanger (41), the heat exchangers (41) of adjacent storage cells (3) being connected to one another and a heat transfer medium flowing through all of the heat exchangers (41) in series.

11. The apparatus according to claim 1, wherein the at least two series-connected storage cells (3) are arranged helically around a center point.

12. The apparatus according to claim 11, wherein the first storage cell (3) is arranged in the center of the helically arranged storage cells (3) and the final storage cell (3) is arranged at the outer edge of the helically arranged storage cells.

13. The apparatus according to claim 11, wherein a pressure-bearing wall (45) is constructed around the final storage cell that is an outermost storage cell of the helically arranged storage cells (3).

14. The apparatus according to claim 1, wherein each storage cell (3) has a thermal compensating profile (47).

15. The apparatus according to claim 14, wherein the thermal compensating profile (47) has at least one indentation protruding into the storage cell (3).

16. The apparatus according to claim 2, wherein the gas space (25) above the colder storage cell (3) extends into the warmer storage cell (3) at the intercellular space (7) directly above the opening (9).

17. The apparatus according to claim 1, wherein there are at least two storage cells (3) between the first storage cell and the final storage cell.

* * * * *